UNITED STATES PATENT OFFICE 2,061,019

SULPHURIZED UNSATURATED ALIPHATIC HYDROCARBONS AND PROCESS OF PREPARING THEM

Albert S. Carter, Wilmington, Del., and Frederick Baxter Downing, Carneys Point, N. J., assignors to E. I. du Pont de Nemours & Company, Wilmington, Del., a corporation of Delaware No Drawing. Application April 18, 1934, Serial No. 721,150

20 Claims. (Cl. 260—16)

This invention relates to the addition of sulphur to unsaturated compounds. More particularly it relates to the simultaneous addition of sulphur and hydrogen sulphide to unsaturated compounds in the presence of catalysts. Still more particularly it relates to the simultaneous addition of sulphur and hydrogen sulphide in the presence of catalysts to those compounds having unsaturated linkages between carbon atoms, which unsaturated linkages are activated by the presence of adjacent negative groups. Still more particularly it relates to the treatment of such sulphur containing addition products to produce further new and useful articles.

In a co-pending application of Wallace H. Carothers, Serial No. 721,151, filed April 18, 1934, the addition of hydrogen polysulphide to nonbenzenoid polymers of acetylene has been described. Carothers' process involves the addition of hydrogen polysulphide which may be formed in advance and mixed with the unsaturated compound, or which may be formed in situ by adding sodium polysulphide to a mixture of the unsaturated compound and an excess of concentrated hydrochloric acid. The methods employed in the present invention distinctly differ, as will be apparent from the further description to be given. The properties exhibited by the products of the two inventions are, in some degree, similar.

It is an object of this invention to produce new and useful products. A further object is the production of addition products by simultaneously reacting hydrogen sulphide and sulphur with unsaturated compounds in the presence of a catalyst. A still further object is the simultaneous addition of hydrogen polysulphide and sulphur to unsaturated hydrocarbons in the presence of catalysts. A still further object is the production of new and useful products by subsequent treatment of the addition product so obtained. Other objects will appear hereinafter.

It has now been found that useful addition products may be obtained by simultaneously reacting sulphur and hydrogen sulphide with unsaturated compounds in the presence of suitable catalysts which are essentially basic compounds, such as amines and hydroxides. A possible mechanism for this new reaction is given below; this mechanism would assist in explaining the similarity between the product of the present invention and those obtained by direct addition of hydrogen polysulphide. The present invention, in any case however, presents an advantage over the process described by Carothers in that all the reactants may be mixed, thereby avoiding the separate formation of the polysulphide. If RNH$_2$ represents the base used as catalyst, the following reaction is known:

the following also is known in some cases:

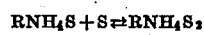

We think that this may give rise to potential hydrogen polysulphide as follows:

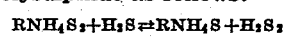

This speculation, though possibly incorrect, explains a manner in which the catalyst may function to give rise to products resembling those obtained from hydrogen polysulphide.

The nature of this invention is illustrated in the following examples, which are to be construed as illustrative only.

Example 1

Seven small steel bombs are cleaned and charged with 100 parts of divinylacetylene (by weight) in each; to each is added sulphur, hydrogen sulphide, and/or dibutylamine as directed below:

Bomb 1. 50 parts of sulphur
Bomb 2. 50 parts of hydrogen sulphide (by weight)
Bomb 3. 2 parts of dibutylamine
Bomb 4. 50 parts sulphur + 50 parts hydrogen sulphide
Bomb 5. 50 parts sulphur + 2 parts dibutylamine
Bomb 6. 50 parts hydrogen sulphide + 2 parts dibutylamine
Bomb 7. 50 parts sulphur + 50 parts hydrogen sulphide + 2 parts dibutylamine These bombs are agitated by shaking for 16 hours at 30° C., at the end of which period they are opened and the products separated by distillation. In the cases of bombs 1, 2, 3, 4, 5 and 6, the products can be separated completely by fractional distillation and are found to be the same in properties and equal in quantity to the ingredients introduced into the bomb, showing that no reaction has taken place. In the case of bomb No. 7, a small amount of hydrogen sulphide may be distilled off and a small amount of sulphur may be found in an insoluble crystalline form, but over 80% of the mixture will be found to consist of a viscous oil which cannot be completely distilled without decomposition and which contains approximately 50% of combined sulphur and no nitrogen.

A small amount of reaction product may be obtained from bomb 6, which resembles that from bomb 7, but generally there is no reaction in bomb 6. It is concluded, therefore, that when evidence of reaction is found in bomb 6 (generally representing only 1 to 3% of the divinylacetylene) it is due to the fact that a portion of the hydrogen sulphide is oxidized or that it contains free sulphur. The evidence above indicates conclusively that the reaction, under these conditions, involves the unsaturated hydrocarbon, sulphur, and hydrogen sulphide, the amine being essential, but acting only as a catalyst.

*Example 2*

Enclose 60 parts (by weight) of divinylacetylene, 30 parts of hydrogen sulphide, 15 parts of sulphur and 4 parts of pyridine in a bomb; agitate under the pressure of the hydrogen sulphide at 30° C. for 16 hours. Upon opening the bomb, the pressure of the hydrogen sulphide will have fallen to nearly one atmosphere (absolute); dissolve the product in benzene and filter off a small amount of free sulphur; distillation of the benzene will give a clear thermoplastic mass which is semi-solid at room temperature. This resinous material contains approximately 50% sulphur and is highly unsaturated as indicated by its ability to absorb oxygen, bromine or hydrogen under proper conditions.

The benzene solution (or a solution in any other solvent) may be used as a lacquer, giving films which possess excellent adhesion to metals and which slowly dry in the air, becoming practically insoluble in all organic solvents.

*Example 3*

Repeat Example 2, but substituting tributylamine for the pyridine. The product obtained will be essentially the same but slightly darker in color.

*Example 4*

Repeat Example 2, but using aniline in place of pyridine. The product will be essentially the same as that obtained in Example 2, but the quantity of the divinylacetylene reacted with sulphur will be somewhat less.

*Example 5*

Boil pure divinylacetylene under a reflux and in an atmosphere of nitrogen for five hours (temperature 83–90° C.); at the end of this refluxing period, distill off about 80% of the divinylacetylene, add 5% of xylene and distill again under reduced pressure until the residue in the flask is essentially all nonvolatile viscous polymer of divinylacetylene. This acetylene polymer, or polymer of divinylacetylene, is a synthetic drying oil and may be used in a lacquer or paint vehicle when dissolved in aromatic solvent. Films of this drying oil possess unusual chemical resistance and when mixed with suitable antioxidants, the films are smooth and extremely hard. These divinylacetylene polymer films, however, possess poor adhesion to metals and are not flexible, resembling a vitreous enamel in their hardness and lack of flexibility.

Enclose 50 parts (by weight) of the above polymer of divinylacetylene, 20 parts of xylene, 20 parts of hydrogen sulphide, 2 parts of sulphur and 0.5 part of pyridine in a bomb and agitate under pressure of the hydrogen sulphide for 16 hours. At the end of this period, release the pressure and volatilize the unreacted hydrogen sulphide by slightly warming the resinous mass. The resulting product is a clear viscous liquid, resembling in appearance the parent divinylacetylene polymer, but containing combined sulphur equivalent to 10 to 12% of the weight of the polymer. This product gives films from solutions upon evaporation which differ from the original polymer in that they are slower to dry, more flexible and possess greatly improved adhesion to metals. Upon heating, the films are slightly thermoplastic, as compared to increased hardness upon heating in the case of the original polymer.

If this preparation is repeated using a smaller amount of sulphur in the reaction mixture, the product will contain a decreased quantity of reacted sulphur. As the sulphur content is decreased, the properties of the resulting product become increasingly more like those of the original material.

*Example 6*

Repeat Example 2 using 2-chloro-1,3-butadiene in place of the divinylacetylene and agitating under the pressure of hydrogen sulphide at 50° C. for 16 hours. After removal of the unreacted hydrogen sulphide and chlorobutadiene, a 50% yield of viscous oil is obtained which slowly polymerizes to a rubber-like mass upon standing. This product contains approximately 20% sulphur, varying somewhat from run to run, depending upon the quantity of chlorobutadiene which undergoes polymerization during the hydrogen sulphide treatment and which is left in the product at the end.

*Example 7*

Repeat Example 2 using 1-heptene in place of divinylacetylene and agitating under pressure for 16 hours at 50° C. At the end of this period the liquid heptene will be found to contain 3 to 6% of combined sulphur.

The above examples demonstrate the manner in which this new reaction may be carried out. In those cases where a comparison has been possible, the products obtained in this manner are in general similar to those obtained through the reaction of hydrogen polysulphide of the approximate formula $H_2S_2$ but differ in molecular weight and sulphur content. In the case of hydrogen polysulphide, the quantity of sulphur added is roughly dependent upon the ratio fixed in the polysulphide, i. e., $x$ in the formula $H_2S_x$. In the case of this new reaction, the mixture of $H_2S$ plus sulphur always reacts as though it were approximately $H_2S_2$, thus if one mole of hydrogen sulphide and six atoms of sulphur are brought into reaction with divinylacetylene, when the hydrogen sulphide is consumed, there will remain approximately five atoms of unreacted sulphur. Likewise, if six moles of hydrogen sulphide and one atom of sulphur are used, the product will consume only one mole of the hydrogen sulphide and five will escape unreacted at the end.

It has been observed that in solution, the divinylacetylene sulphur reaction products containing approximately 50% sulphur, slowly undergo decomposition, precipitating approximately half of the sulphur in the elementary state. This may be taken as evidence that the original sulphur compound possessed the structure R—S—S—R, in which R is the hydrocarbon chain, and upon decomposition, R—S—R was formed.

The reaction has been found especially applicable to enynes, or compounds containing the grouping —C=C—C≡C—, such as vinylacetylene, divinylacetylene, other straight chain polymers of acetylene, and polymers of these acetylene polymers. It has been found to take place somewhat less vigorously with dienes, such as chlorobutadiene, and with negatively substituted olefines such as styrene; the reaction is considerably less active with olefines containing a double bond in the alpha position, such as 1-heptene, and takes place to little extent with double bonds located within carbon chains, as 3-heptene and 1,3-dichloro-2-butene.

Pressure appears to assist in the reaction, but is not essential. Thus it has been found that a mixture of divinylacetylene, sulphur and dibutylamine, in the ratios indicated in the examples, will slowly absorb hydrogen sulphide when vigorously agitated at room temperature and under atmospheric pressure. In the case of these compounds which react more slowly under pressure, the reaction at atmospheric pressure becomes increasingly more difficult. Pressure, therefore, is considered merely as an agent to increase the velocity of the reactions and it may be held at any point desired between 1 atmosphere and the pressure limit of the apparatus. It being understood that some reactions which take place under a hydrogen sulphide pressure of two or more atmospheres, may be almost inappreciable at atmospheric pressure.

It has also been found that increasing the temperature of the reaction increases the velocity; further, with a given weight of hydrogen sulphide, the pressure may be advantageously increased simply by operating at higher temperature. There appears to be no limit to the degree to which the temperature may be increased; but we are aware that at higher temperatures, uncatalyzed reactions may set in between the unsaturated compounds and either sulphur or hydrogen sulfide, and for the purpose of this invention, it is desirable to avoid those conditions.

We have found that among the substances which serve as catalysts for the reaction are certain basic catalysts such as free bases, sulphides, polysulphides, oxides and hydroxides. Any compound from the group comprising oxides, hydroxides, sulphides, polysulphides or free base of alkali or alkaline earth metals, ammonia or organic nitrogenous bases, will serve to bring about some appreciable reaction, but their effectiveness appears to be controlled by their solubility in the reaction mixture, or the solubility of their polysulphides, and by their alkalinity. Thus, dibutylamine is a better catalyst than aniline, probably owing to alkalinity; it is also a better catalyst than sodium hydroxide, probably owing to solubility. Typical catalysts which have been used successfully include dibutylamine, monobutylamine, tributylamine, pyridine, aniline, dimethylamine, piperidine, p-toluidine, ammonia, sodium hydroxide and potassium hydroxide. It has been found advantageous to add small amounts of water to the reaction mixture when inorganic bases, such as ammonia and sodium hydroxide are used. Some basic substances, such as zinc oxide, copper oxide, iron oxide, mercuric oxide, etc., appear to give only traces of reaction product, apparently owing to their insolubility.

Obviously the use of the free bases under the conditions of this reaction is the equivalent of adding equimolecular quantities of the corresponding sulphides or polysulphides, for these are formed, in part, from the bases when mixed with hydrogen sulphide and sulphur. We prefer the use of the free bases, rather than the sulphide or polysulphide salts, because of their greater ease of formation and stability in handling, and since there is no necessity of preparing the sulphides from the bases externally when they may be formed during the reaction in the mixture itself. The quantity of catalyst may be varied as desired, the rate of reaction being increased with an increase in catalyst concentration. On the other hand, a portion of the hydrogen sulphide and sulphur is rendered inactive owing to its combination with the catalyst, so if the free bases are used, this fact must be considered and the sulphides added in sufficient quantity to be in excess.

As has been disclosed in the case of the addition products of hydrogen polysulphide, these products may be varied by the quantities of sulphur added. In general we are dealing with compounds, such as divinylacetylene, in which more than one olefinic linkage may be involved in the sulphur addition. It is possible, therefore, to vary the degree to which addition takes place by controlling the ratio of hydrocarbon to hydrogen sulphide and sulphur. In general the fluidity decreases and the products become less soluble as the ratio of sulphur added is increased.

The heat treatment described in the co-pending application of Carothers, above identified, may also be applied to products of the present invention. This treatment involves heating the addition products substantially above room temperature in the presence of solvents, or in the presence of a portion of the unsaturated compound used in the preparation of the addition product. Some of the addition products still contain unsaturation after reaction with the hydrogen polysulphide and sulphur and may serve as starting points for further reactions to produce additional new products.

As is apparent from the above description the present invention has the advantage over that described in the co-pending Carothers' application, that the steps involving the formation of the polysulphide salt and the liberation of the unstable hydrogen polysulphide, or the formation of the hydrogen polysulphide itself before it is added to the reaction mixture may be avoided. Obviously the advantage of this new process is largely a decrease in labor and greater ease in handling the reactants. In addition, however, in some cases a further advantage appears in that low sulphur ratios are more readily obtained in this manner than through the use of the polysulphide.

It is obvious that many apparent and widely different embodiments of this invention may be made without departing from the spirit and scope thereof and, therefore, it is not intended to limit the invention except as indicated in the appended claims.

We claim:

1. The process which comprises reacting an unsaturated aliphatic compound with hydrogen sulphide and sulphur in the presence of a basic catalyst.

2. The process of claim 1 characterized in that the catalyst is a basic catalyst soluble in the reaction mixture.

3. The process which comprises reacting an unsaturated aliphatic hydrocarbon with sulphur and hydrogen sulphide in the presence of a basic catalyst soluble in the reaction mixture.

4. The process as described in claim 1 in which the unsaturated compound contains at least one of the following groups

and in which the catalyst is a basic catalyst, soluble in the reaction mixture.

5. The process which comprises reacting an unsaturated aliphatic hydrocarbon containing conjugate unsaturation involving an acetylenic linkage with hydrogen sulphide and sulphur in the presence of a basic catalyst soluble in the reaction mixture.

6. The process of claim 5 characterized in that the catalyst is formed in the reaction mixture by adding dibutylamine.

7. The process of claim 5 characterized in that the catalyst is formed in the reaction mixture by adding aniline.

8. The process of claim 5 characterized in that the catalyst is formed in the reaction mixture by adding pyridine.

9. The process which comprises reacting an unsaturated aliphatic hydrocarbon with hydrogen sulphide and sulphur in a closed container under the pressure of the hydrogen sulphide and in the presence of a basic catalyst soluble in the reaction mixture.

10. The process of claim 9 characterized in that the unsaturated aliphatic hydrocarbon contains conjugate unsaturation involving an acetylenic linkage.

11. The process which comprises reacting divinylacetylene with hydrogen sulphide and sulphur in a closed container under the pressure of the hydrogen sulphide and in the presence of a basic catalyst soluble in the reaction mixture.

12. The process of claim 11 characterized in that the basic catalyst is formed in the reaction mixture by adding dibutylamine.

13. The process of claim 11 characterized in that it is carried out at about 30° C.

14. A product obtained by reacting an unsaturated aliphatic compound with hydrogen sulphide and sulphur in the presence of a catalyst.

15. An addition product obtained by reacting an unsaturated aliphatic hydrocarbon with hydrogen sulphide and sulphur in the presence of a basic catalyst soluble in the reaction mixture.

16. A product obtained by reacting an unsaturated aliphatic hydrocarbon containing conjugate unsaturation involving an acetylenic linkage with hydrogen sulphide and sulphur in the presence of a basic catalyst soluble in the reaction mixture.

17. A product obtained by reacting divinylacetylene in a closed container with hydrogen sulphide and sulphur under pressure of the hydrogen sulphide in the presence of a catalyst formed in the reaction mixture by adding dibutylamine.

18. The process which comprises reacting an aliphatic hydrocarbon containing the following group

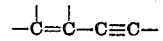

with hydrogen sulphide and sulphur in the presence of an organic nitrogen base soluble in the reaction mixture.

19. An addition product of an unsaturated aliphatic hydrocarbon, hydrogen sulphide and sulphur.

20. Addition products of divinylacetylene, hydrogen sulphide and sulphur, said products varying in consistency from resin-like masses to viscous oils and yielding chemically resistant protective films upon drying in the presence of air.

ALBERT S. CARTER.
FREDERICK BAXTER DOWNING.